United States Patent
Lee et al.

(10) Patent No.: US 11,170,049 B2
(45) Date of Patent: Nov. 9, 2021

(54) METHOD FOR POSITION ESTIMATION OF VEHICLE BASED ON GRAPH STRUCTURE AND VEHICLE USING THE SAME

(71) Applicant: NAVER LABS CORPORATION, Seongnam-si (KR)

(72) Inventors: Jinhan Lee, Seongnam-si (KR); Sunwook Choi, Seongnam-si (KR); Unghui Lee, Seongnam-si (KR)

(73) Assignee: NAVER LABS CORPORATION, Seongnam-si (KR)

(*) Notice: Subject to any disclaimer, the term of this patent is extended or adjusted under 35 U.S.C. 154(b) by 76 days.

(21) Appl. No.: 16/774,857

(22) Filed: Jan. 28, 2020

(65) Prior Publication Data

US 2020/0242166 A1 Jul. 30, 2020

(30) Foreign Application Priority Data

Jan. 28, 2019 (KR) .................. 10-2019-0010538

(51) Int. Cl.
*G06F 17/30* (2006.01)
*G06F 16/901* (2019.01)
(Continued)

(52) U.S. Cl.
CPC ........ *G06F 16/9024* (2019.01); *G06F 16/273* (2019.01); *G06F 16/275* (2019.01); *G06F 16/284* (2019.01)

(58) Field of Classification Search
CPC .......... G06F 16/13; G06F 16/21; G06F 16/24; G06F 16/156; B60L 2240/60; B60R 25/209
See application file for complete search history.

(56) References Cited

U.S. PATENT DOCUMENTS

2011/0130916 A1* 6/2011 Mayer .................. G08G 1/127
    701/31.4
2014/0032012 A1* 1/2014 Joshi .................... G05D 1/0274
    701/1
(Continued)

FOREIGN PATENT DOCUMENTS

| KR | 101553898 B1 | 9/2015 |
| KR | 1020160147127 A | 12/2016 |
| KR | 1020180117879 A | 10/2018 |

OTHER PUBLICATIONS

EP Search Report issued in European patent application No. 20 15 4084, dated Jun. 19, 2020.

(Continued)

*Primary Examiner* — Hung D Le
(74) *Attorney, Agent, or Firm* — Greer Burns & Crain Ltd.

(57) ABSTRACT

A method for position estimation of a vehicle based on a graph structure according to an exemplary embodiment of the present invention may include a sensing step of creating sensing data according to translation of the vehicle using a plurality of sensors; a graph structure creating step of creating a node according to a reference period and setting a constraint condition between the nodes to the sensing data synchronized with the reference period to create a graph structure; a graph structure modifying step of modifying the graph structure using the asynchronous sensing data when the asynchronous sensing data which is not synchronized with the reference period among the sensing data is input; and a position estimating step of creating position information of the vehicle using the graph structure.

18 Claims, 8 Drawing Sheets

(51) Int. Cl.
*G06F 16/27* (2019.01)
*G06F 16/28* (2019.01)

(56) References Cited

U.S. PATENT DOCUMENTS

2018/0077534 A1* 3/2018 Le Grand ............. H04W 24/10
2019/0278284 A1* 9/2019 Zhang .............. G08G 1/096708
2020/0192372 A1* 6/2020 Levandowski .. G08G 1/096775

OTHER PUBLICATIONS

Office action issued in Korean patent application No. 10-2019-0010538, dated Aug. 30, 2019.

* cited by examiner

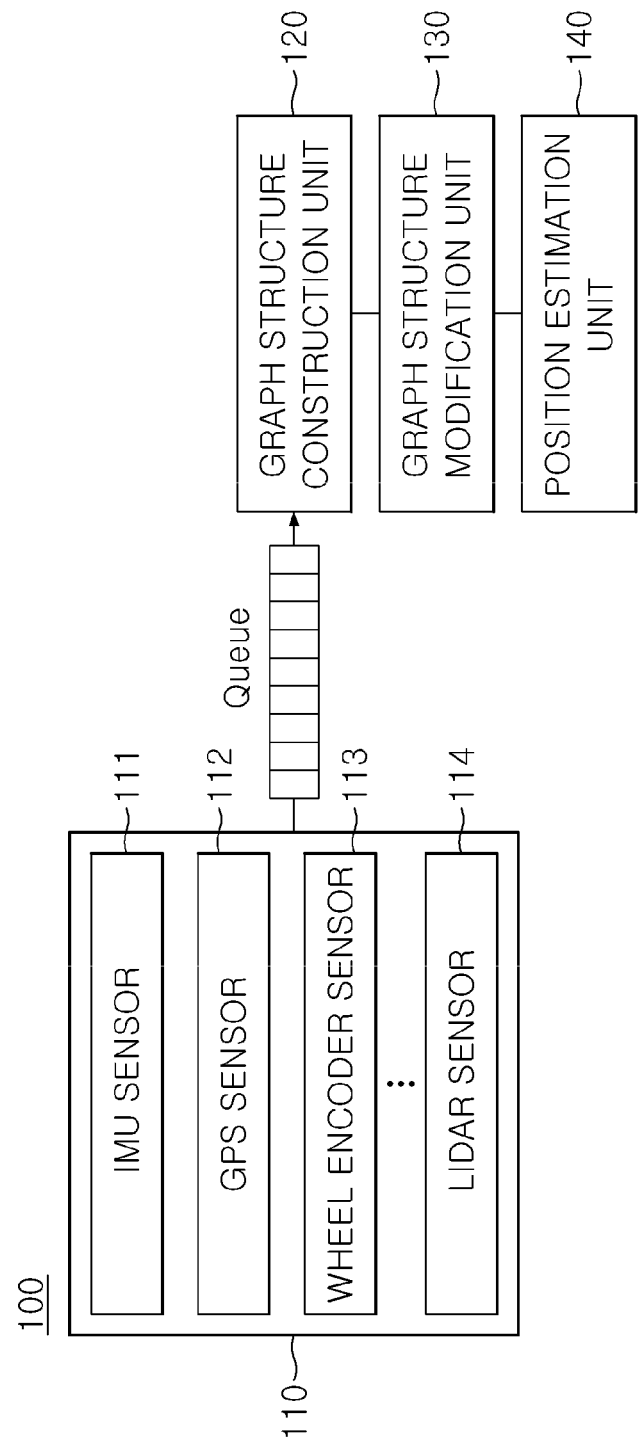

METHOD FOR POSITION ESTIMATION OF VEHICLE BASED ON GRAPH STRUCTURE AND VEHICLE USING THE SAME

CROSS-REFERENCE TO RELATED APPLICATIONS

This application claims priority to Korean Patent Application No. 10-2019-0010538 filed on Jan. 28, 2019 in Korean Intellectual Property Office, the entire contents of which is hereby incorporated by reference in its entirety.

BACKGROUND OF THE INVENTION

Field of Invention

The present invention relates to a method for position estimation of vehicle based on a graph structure and vehicle using the same and particularly, to a method for position estimation of vehicle based on a graph structure and vehicle using the same capable of matching asynchronous sensing data with a graph structure.

Description of Related Art

An autonomous driving system that performs autonomous driving by searching a driving position has been mainly applied to vessels, aircrafts, etc., and recently, has been applied to vehicles driving on the roads.

The autonomous driving system determines a driving behavior and a driving trace based on positions of a driving vehicle and surrounding vehicles. For example, the autonomous driving system informs a user of various information such as a driving route and road congestion through a monitor or self-drives a vehicle or controls a driving state.

In the autonomous driving system, accuracy of the position recognition is an important element technology directly related to driving safety, and an existing autonomous driving system probabilistically recognizes a position of the user's vehicle and a position of a surrounding vehicle using a local sensor mounted on the user's vehicle.

For example, the vehicle may automatically drive according to a predetermined condition by mounting all sensor devices such as a scanning device, a camera, and a radar, a computing device, and software for vehicle control and autonomous driving on a vehicle.

BRIEF SUMMARY OF THE INVENTION

The present invention has been made in an effort to provide a method for position estimation of a vehicle based on a graph structure and a vehicle using the same capable of matching sensing data in a graph structure by modifying the graph structure when a node creation time of the graph structure and a creation time of the sensing data of a sensor are different from each other.

The present invention has also been made in an effort to provide a method for position estimation of a vehicle based on a graph structure and a vehicle using the same capable of minimizing the number of nodes to be added to the graph structure by selectively applying sensor data interpolation and graph node interpolation.

An exemplary embodiment of the present invention provides a method for position estimation of a vehicle based on a graph structure which may include a sensing step of creating sensing data according to translation of the vehicle using a plurality of sensors; a graph structure creating step of creating a node according to a reference period and setting a constraint condition between the nodes to the sensing data synchronized with the reference period to create a graph structure; a graph structure modifying step of modifying the graph structure using the asynchronous sensing data when the asynchronous sensing data which is not synchronized with the reference period among the sensing data is input; and a position estimating step of creating position information of the vehicle using the graph structure.

Another exemplary embodiment of the present invention provides a vehicle which may include a sensor unit configured to create sensing data according to translation of the vehicle using a plurality of sensors; a graph structure construction unit configured to create a node according to a reference period and set a constraint condition between the nodes to the sensing data synchronized with the reference period to create a graph structure; a graph structure modification unit configured to modify the graph structure using the asynchronous sensing data when the asynchronous sensing data which is not synchronized with the reference period among the sensing data is input; and a position estimation unit configured to create position information of the vehicle using the graph structure.

The technical solution above does not list all features of the present invention. Various features of the present invention and advantages and effects according thereto will be understood in more detail with reference to specific embodiments below.

According to the exemplary embodiment, in the method for position estimation of the vehicle based on the graph structure and the vehicle using the same, when the node creation time of the graph structure and the creation time of the sensing data of the sensor are different from each other, the graph structure may be modified to match the sensing data in the graph structure. That is, since the asynchronous sensing data may be reflected to the graph structure, it is possible to accurately estimate a position of the vehicle.

According to the exemplary embodiment of the present invention, in the method for position estimation of the vehicle based on the graph structure and the vehicle using the same, the graph structure may be modified by applying selectively sensor data interpolation and graph node interpolation. In this case, since the number of nodes to be added to the graph structure may be minimized, it is possible to reduce a time required in optimization of the graph structure, a computation amount, etc. and to maintain the real time of the position estimation.

However, effects to be achieved by the method for position estimation of the vehicle based on the graph structure and the vehicle using the same according to the exemplary embodiment of the present invention are not limited to effects mentioned above, and other effects which are not mentioned will be apparently understood to those skilled in the art from the following description.

BRIEF DESCRIPTION OF THE DRAWINGS

FIG. 1 is a block diagram illustrating a vehicle according to an exemplary embodiment of the present invention.

DETAILED DESCRIPTION OF THE INVENTION

Figure 2A:
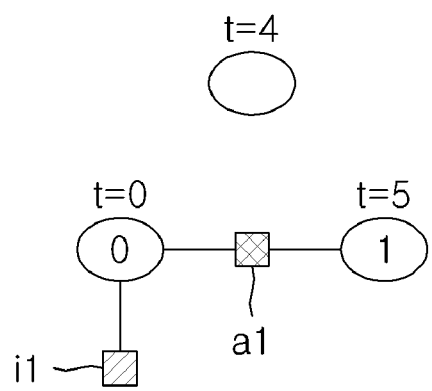
FIGS. 2A-2B, 3A-3B, 4A-4B, 5A-5B, 6A-6B and 7A-7B are exemplary views illustrating creation of a graph structure according to exemplary embodiments of the present invention.

Hereinafter, exemplary embodiments disclosed in this specification will be described in detail with reference to the accompanying drawings and the same or similar components are denoted by the same reference numerals regardless of the drawing, and duplicated description thereof will be omitted. Suffixes "module" and "unit" for components used in the following description are given or mixed in consideration of easy preparation of the specification only and do not have their own distinguished meanings or roles. Further, the term "unit" used in the specification means software and hardware components such as FPGA or ASIC and the "unit" performs predetermined roles. A "unit' may also be a processor designed to perform a specific task or tasks. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In describing the exemplary embodiment of this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

A vehicle may include a car, a robot, and a drone, which autonomously drive. The vehicle may perform position estimation (localization) for recognizing a current position, verify position information and pose information of the current vehicle through the position estimation, and then perform a control and the like for autonomous driving based thereon.

The vehicle may collect sensing data from a plurality of sensors and create a graph structure using the received sensing data for position estimation. Here, the graph structure integrates and illustrates the plurality of sensing data and when the graph structure is used, position information of the vehicle may be rapidly and accurately extracted.

In the position information of the vehicle extracted by the position estimation, rotation information, translation information, and velocity information of the vehicle may be included. In the rotation information, a 3-axial rotational amount of a pitch, a roll, and a yaw may be included, and the translation information may be a coordinate on a map where the vehicle is positioned. Further, the velocity information may be a velocity vector indicating a translation direction and a velocity of the vehicle. That is, using the rotation information, the translation information, and the velocity information of the position information, it is possible to easily determine current position and pose of the vehicle.

However, the sensing data measured by the sensors of the vehicle may have different creation periods, and when asynchronous sensing data is input, there may be a problem with processing the sensing data. That is, in the case of excluding the asynchronous sensing data when the graph structure is created, a problem in accuracy may occur, and in the case of applying the asynchronous sensing data, a problem in real time of the position information may occur by a latency according to modification and the like of the graph structure.

According to the vehicle according to an exemplary embodiment of the present invention, it is possible to modify the graph structure by incorporating the asynchronous sensing data, and as a result, it is possible to perform the position estimation of the vehicle rapidly and accurately. Hereinafter, a vehicle according to an exemplary embodiment of the present invention will be described with reference to FIG. 1.

FIG. 1 is a block diagram illustrating a vehicle according to an exemplary embodiment of the present invention.

Referring to FIG. 1, a vehicle 100 according to an exemplary embodiment of the present invention may include a sensor unit 110, a graph structure construction unit 120, a graph structure modification unit 130, and a position estimation unit 140.

The sensor unit 110 may include a plurality of sensors and create each sensing data according to translation of the vehicle 100 using the plurality of sensors. Specifically, as illustrated in FIG. 1, the sensor unit 110 may include an IMU sensor 111, a GPS sensor 112, a wheel encoder sensor 113, a LiDAR sensor 114, and the like. However, the sensors included in the sensor unit 110 are not limited thereto, and in addition, various types of sensors may be included in the sensor unit 110. Further, the sensors included in the sensor unit 110 may be positioned inside or outside the vehicle 100, and the type and the number of sensors positioned in the vehicle 100 are not limited thereto. The graph structure construction unit 120, the graph structure modification unit 130, and the position estimation unit 140 may be implemented as a processor that executes the respective functions of these units according to instructions in program codes, which may be stored in a memory accessible to the processor. The units 120, 130 and 140 of FIG. 1 may also be implemented as three separate and dedicated processors each performing its respctive function.

The inertial measurement unit (IMU) sensor 111 may include an acceleration sensor and a gyro sensor (gyroscope) as an inertial measurement means. For example, the IMU sensor 111 may create sensing data such as an angular velocity increment value of a forward direction (roll-axial direction), a right direction (pitch-axial direction) of the forward direction, and a gravity direction (yaw-axial direction) as a rotational angle of the vehicle 100 and a velocity increment value of the vehicle 100. Further, the IMU sensor 111 may create an IMU odometry using the sensing data. That is, by measuring change amounts of the acceleration velocity and angular velocity from an initial condition, it is possible to provide the IMU odometry of a translation direction and a translation distance of the vehicle 100.

The GPS sensor 112 may provide a coordinate on the ground of the vehicle 100 as the sensing data by communicating with a satellite. For example, the GPS sensor 112 may provide geodesic coordinates of the WGS84 coordinate system, that is, a latitude, a longitude, and an ellipsoidal height.

The wheel encoder sensor 113 is to measure and provide the number of rotations of the wheel provided in the vehicle 100, and the translation distance, the translation velocity, and the like of the vehicle 100 may be measured by using the wheel encoder sensor 113.

The LiDAR sensor 114 radiates laser pulses and the like to the surroundings and then measures a time taken to be reflected and returned to create 3D depth information about the surroundings of the vehicle 100. Here, the LiDAR sensor 114 may be used to measure a rotational amount of the vehicle 100 or create a visual odometry. Accordingly, the LiDAR sensor 114 may be used to measure a translation direction, the translation distance, and the like of the vehicle 100. According to an exemplary embodiment, a 3D LiDAR of Velodyne VLP-16 may be used as the LiDAR sensor 114, but is not limited thereto.

The sensor unit 110 may further include a camera and the like, and the camera is used to take an image corresponding to the translation of the vehicle 100. In this case, the visual odometry of the vehicle 100 may be created from the camera.

The sensing data created by the sensor unit 110 may be divided into unary data and binary data. Here, the unary data indicates a measuring result at a creation time of the sensing data and includes coordinate values and the like measured by the GPS sensor 112. That is, latitude and longitude coordinate values corresponding to the position of the vehicle 100 at a specific time are created by the GPS sensor 112 to correspond to the unary data.

In contrast, the binary data indicates a result of measuring relationship information between a measurement start time and a measurement end time of the sensing data and includes an IMU odometry and the like of the IMU sensor 111. That is, since the information about the translation direction and the translation distance is extracted using the change amount of the acceleration between the measurement start time and the measurement end time instead of the acceleration value at the specific time, the IMU odometry corresponds to the binary data.

The sensing data created in the sensor unit 110 may be input to a queue and the input sensing data may be input to the graph structure construction unit 120 in sequence. However, the creation periods of the sensing data included in the sensor unit 110 may be different from each other, and a time for creating the sensing data and then inputting the sensing data to the queue may also vary, respectively.

The graph structure construction unit 120 may create a node (i.e., a vertex of the graph) according to a reference period and set a constraint condition (i.e, a spatial contraint) between nodes to the sensing data synchronized with the reference period to create the graph structure. Here, the graph structure construction unit 120 may set any one of the sensing data as reference data and set a creation period of the reference data as a reference period. That is, according to the creation period of the reference data, the nodes are created to create the graph structure. At this time, the sensing data synchronized with the reference period may be input together and the input sensing data may be set as a constraint condition of the corresponding node. According to an exemplary embodiment, the IMU odometry of the IMU sensor 111 may be set as the reference data.

Specifically, as illustrated in FIG. 2A, the graph structure construction unit 120 may create a first node at a time of t=0 at the first time and set an initial condition i1 of the first node as the constraint condition. After, the graph structure construction unit 120 may create a second node at a time of t=5 and set a constraint condition a1 connecting the first node and the second node. That is, the reference period may be 5 and the IMU odometry between t=0 and t=5 may be set as the constraint condition a1. As such, a node corresponding to the position of the vehicle 100 is newly created every reference period and the constraint condition corresponding to the sensing data is set to each node to create the graph structure of the vehicle 100.

The graph structure modification unit 130 may modify the graph structure using the asynchronous sensing data when the asynchronous sensing data which is not synchronized with the reference period among the sensing data is input.

As illustrated in FIG. 1, the sensing data created in the sensor unit 110 may be input to the graph structure construction unit 120 in sequence through a queue. At this time, the sensing data may be sequentially input to the queue according to a created order, but according to the exemplary embodiment, periods for creating the sensing data by the sensors may not coincide with each other. Further, a time required to create the sensing data varies for each sensor, and despite the sensing of data at the same time, a case where the sensing data may be input relatively late to the queue may also occur.

That is, the sensing data created by the sensors of the sensor unit 110 may have different creation periods, and the asynchronous sensing data which is not synchronized with the creation period of the node may be input. At this time, in the case of simply excluding the asynchronous sensing data, accuracy in position estimation may be a problem, and thus it is necessary to modify the graph structure to match the asynchronous sensing data to the graph structure. Accordingly, the graph structure modification unit 130 may modify the graph structure to match the asynchronous sensing data in the graph structure.

Specifically, the graph structure modification unit 130 may first verify a creation time of the received asynchronous sensing data. That is, the creation time of the asynchronous sensing data and a creation time of the first node created recently in the graph structure may be compared with each other.

Here, when the asynchronous sensing data is created after the creation time of the first node, the second node corresponding to the creation time of the asynchronous sensing data may be newly created to be added to the graph structure. That is, since this corresponds to a case where the asynchronous sensing data is first input before the reference period arrives, a node corresponding to the creation time of the corresponding asynchronous sensing data is added to reflect the asynchronous sensing data onto the graph structure. In this case, a first constraint condition corresponding to the asynchronous sensing data may be set to the second node and a second constraint condition between the first node and the second node may be set using the reference data.

Figure 4A:
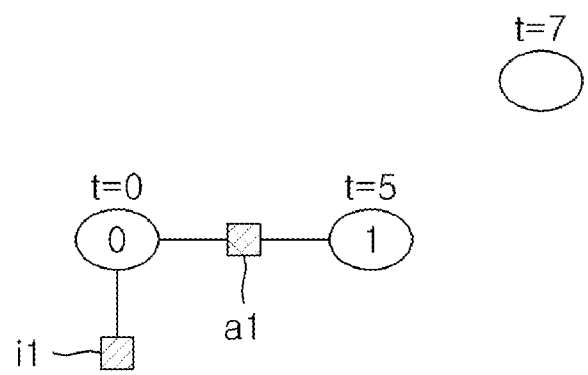

Specifically, as illustrated in FIG. 4A, in an existing graph structure, each node may be created at t=0 and t=5 and then the initial condition i1 may be set as a constraint condition of t=0, and the constraint condition a1 according to the IMU odometry may be set between the nodes at t=0 and t=5. Here, since the nodes are created up to t=5, thereafter, a node at t=10 will be created according to the reference period, but this corresponds to a case where the asynchronous sensing data is input at a current time of t=7.

Figure 4B:
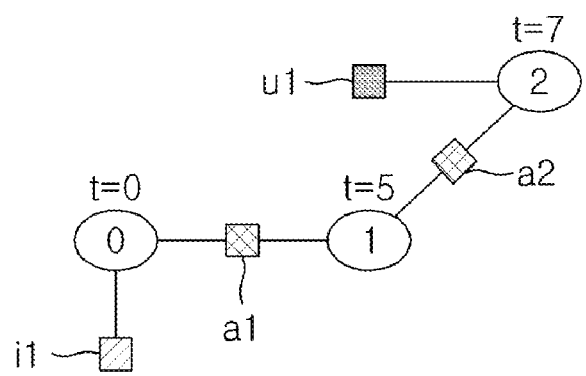

In this case, as illustrated In FIG. 4B, since t=7 corresponds to future data as compared with a current graph structure, a node corresponding to t=7 may be added. Thereafter, a constraint condition a2 may be set using a node at the closest t=5 and the reference data, and a constraint condition u1 at t=7 may be set by applying the asynchronous sensing data corresponding to t=7. That is, based on the graph structure, in the case where the future data that has not yet been created is input, it is possible to modify the graph structure to add nodes corresponding to the corresponding asynchronous sensing data.

On the other hand, based on the creation time of the first node created most recently in the graph structure, when the asynchronous sensing data is created before the creation time of the first node, the graph structure may be modified using graph node interpolation or sensor data interpolation.

Specifically, when the asynchronous sensing data is unary data and the creation time of the asynchronous sensing data is different from the creation time of any of the nodes included in the graph structure by a predetermined interval or more, the graph node interpolation may be used. That is, when the creation time of the asynchronous sensing data is not close to the creation time of the nodes included in the graph structure, the asynchronous sensing data may be matched by a method of further including an additional node in the graph structure.

In the case of using the graph node interpolation, the graph structure modification unit 130 may newly create the second node at the creation time of the asynchronous sensing data and set a first constraint condition corresponding to the asynchronous sensing data to the second node. Further, a second constraint condition may be set using a between factor between the second node and the existing node (i.e., spatial constraints between two nodes (vertices)).

Figure 2B:
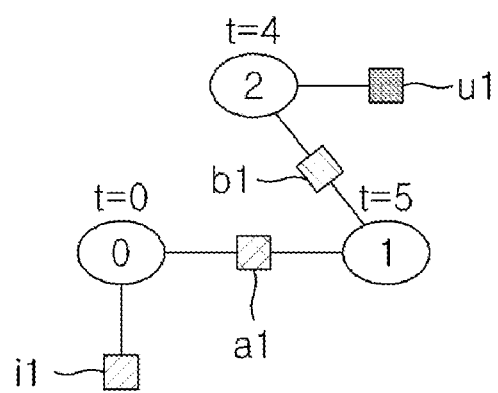

Specifically, as illustrated in FIGS. 2A and 2B, after nodes corresponding to t=0 and t=5 are created, respectively, there may be a case where the asynchronous sensing data corresponding to a time of t=4 is input. Here, since the graph structure is already created up to a time of t=5, it is necessary to modify the graph structure to reflect the asynchronous sensing data corresponding to a time of t=4. Here, the asynchronous sensing data is created at the time of t=4, and has a difference from the nodes included in the existing graph structure by a predetermined interval or more (e.g., t=1). Accordingly, in FIG. 2A, the graph node interpolation may be applied.

In this case, as illustrated in FIG. 2B, a node corresponding to t=4 at which the asynchronous sensing data is created may be newly created, and the constraint condition u1 corresponding to the asynchronous sensing data may be set to the node corresponding to t=4. Here, it is necessary to add a constraint condition connecting the node at t=4 and the node at t=5, and to this end, an additional between factor may be set to set a constraint condition b1. For example, when the asynchronous sensing data created at t=4 is a GPS coordinate value, position information at t=5 is compared with the GPS coordinate value at t=4, and then the between factor may be set as a wheel encoder value to proceed up to a position of t=5 in the GPS coordinate at t=4. However, the between factor is not limited thereto and may be variously set according to an exemplary embodiment.

Figure 3A:
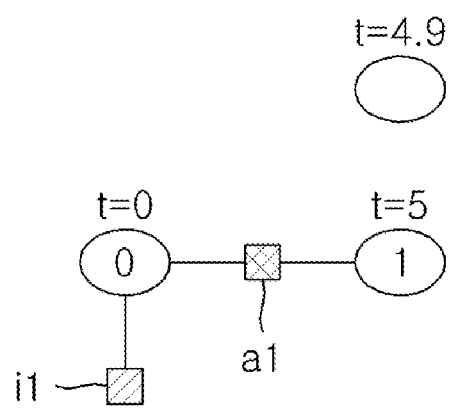
Figure 3B:
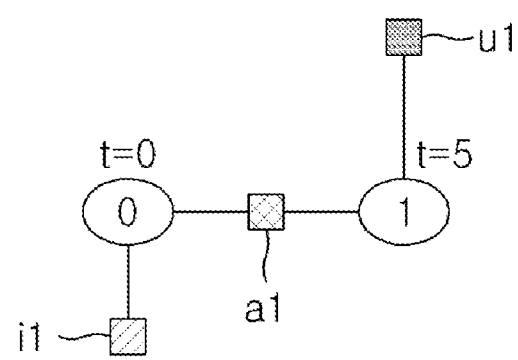

When the asynchronous sensing data is unary data and there is a target node which has a difference by less than a predetermined interval (e.g., t=1) from the creation time of the asynchronous sensing data is present among any of the nodes included in the graph structure, the sensor data interpolation may be used. That is, as illustrated in FIG. 3A, when the creation time of the asynchronous sensing data is t=4.9 and there is a target node in which the creation time is t=5 in the existing graph structure, there is a target node having a difference less than a predetermined interval. Accordingly, as illustrated in FIG. 3B, the node corresponding to the asynchronous sensing data is not separately created and the graph structure may be modified to add the constraint condition u1 corresponding to the asynchronous sensing data at the target node (t=5) included in the existing graph structure.

That is, when the creation time of the asynchronous sensing data is different from the node of the existing graph structure by less than a predetermined interval, the graph structure modification unit 130 may rapidly reflect the asynchronous sensing data onto the graph structure by applying the sensor data interpolation. In addition, when there is a difference by the predetermined interval or more, the graph structure modification unit 130 may accurately reflect the asynchronous sensing data onto the graph structure by applying the graph node interpolation. Accordingly, according to an exemplary embodiment of the present invention, it is possible to rapidly and accurately reflect the asynchronous sensing data onto the graph structure.

Even when the input asynchronous sensing data is the binary data, the graph structure modification unit 130 may modify the graph structure and reflect the modified graph structure. Specifically, when the asynchronous sensing data is the binary data, the graph node interpolation may be used.

That is, when the measurement start time and the measurement end time of the asynchronous sensing data are before the creation time of the first node, a second node and a third node may be created at the measurement start time and the measurement end time of the asynchronous sensing data, respectively, and a first constraint condition between the second node and the third node may be set using the asynchronous sensing data. Further, a second constraint condition and a third constraint condition may be set by using each between factor between target nodes closest to the second node and the third node.

Figure 5A:
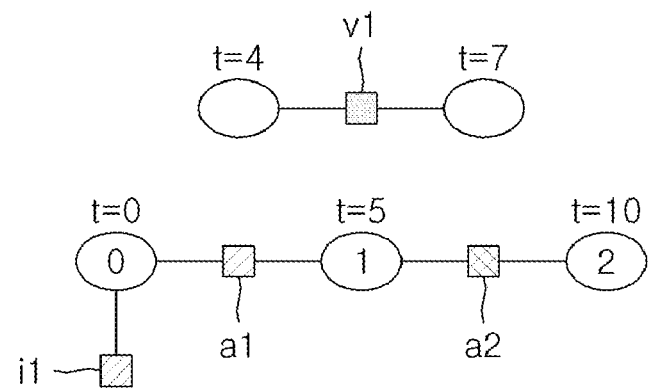
Figure 5B:
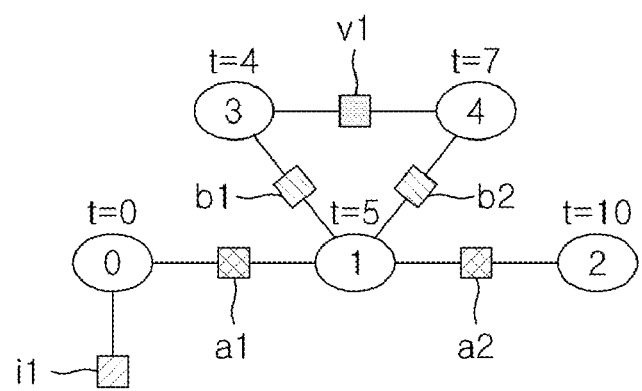

For example, as illustrated in FIGS. 5A and 5B, while respective nodes may be created at times of t=0, t=5, and t=10 to construct the graph structure, binary data of which the measurement start time is t=4 and the measurement end time is t=7 may be input. In this case, nodes corresponding to t=4 and t=7 may be created, respectively, and a constraint condition v1 connecting the respective nodes may be set using the asynchronous sensing data. Further, constraint conditions b1 and b2 may be set by using each between factor between nodes of t=4 and t=5 adjacent to t=7. Here, the between factor is able to be variously set according to an exemplary embodiment.

According to the exemplary embodiment, there may be a case where the measurement start time of the asynchronous sensing data is before the creation time of the first node and the measurement end time of the asynchronous sensing data is after the creation time of the first node. At this time, the second node and the third node may be created at the measurement start time and the measurement end time of the asynchronous sensing data and the first constraint condition between the second node and the third node may be set using the asynchronous sensing data. Here, the first constraint condition between the second node and the first node may be set by using the between element, and the second constraint condition between the third node and the first node may be set by using the reference data.

Figure 6A:
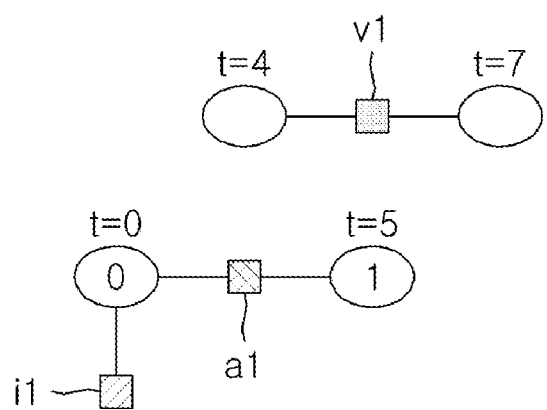
Figure 6B:
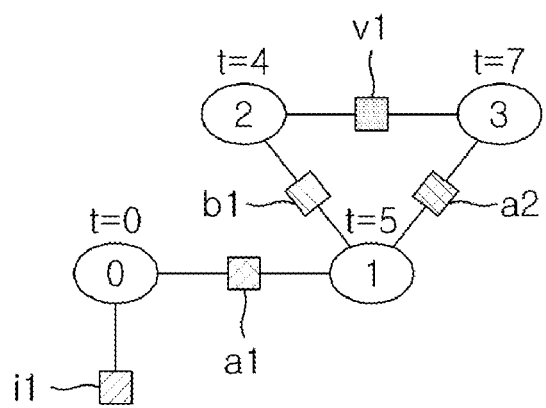

In other words, as illustrated in FIGS. 6A and 6B, while respective nodes may be created at times of t=0 and t=5 to construct the graph structure, binary data of which the measurement start time is t=4 and the measurement end time is t=7 may be input. In this case, nodes corresponding to t=4 and t=7 may be created, respectively, and a constraint condition v1 connecting the respective nodes may be set by using the asynchronous sensing data. Further, constraint conditions b1 and a2 may be set by using each between factor and the reference data with respect to the nodes of t=4 and t=5 adjacent to t=7.

Figure 7A:
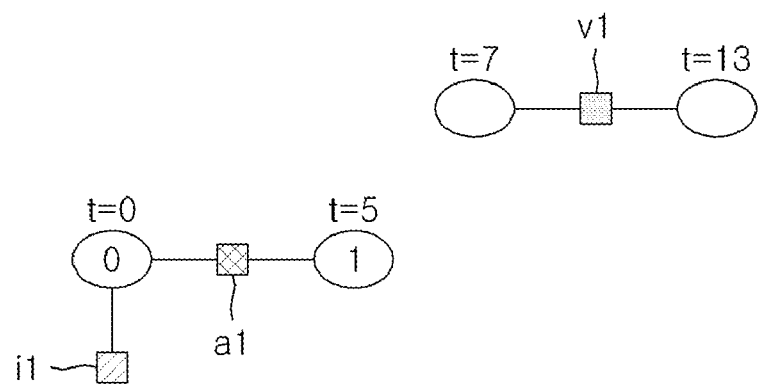
Figure 7B:
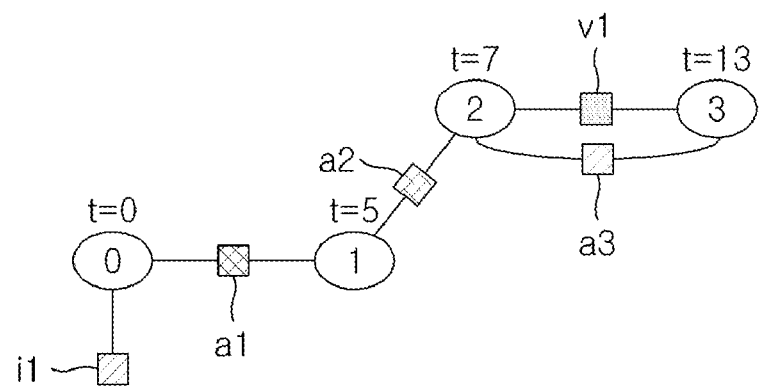

As illustrated in FIGS. 7A and 7B, there may be a case where a measurement start time (t=7) and a measurement end time (t=13) of the asynchronous sensing data are after the creation time (t=5) of the first node. At this time, the graph structure modification unit 130 may create the second node and the third node at the measurement start time (t=7) and the measurement end time (t=13) of the asynchronous sensing data and set a constraint condition v1 between the second node and the third node by using the asynchronous sensing data. Thereafter, a constraint condition a2 between the second node (t=7) and the first node (t=5) and a constraint condition a3 between the second node (t=7) and the third node (t=13) may be set by using the reference data, respectively.

The position estimation unit 140 may create position information of the vehicle 100 by using the graph structure. Specifically, the position estimation unit 140 may apply graph optimization based on the constructed graph structure and estimate a translation route of the vehicle 100 and a final position over time by using the optimized graph structure. That is, the position estimation unit 140 may finally extract the position information including the rotation information, the translation information, and the velocity information of the vehicle 100 from the graph structure. Thereafter, based on the position information extracted from the position estimation unit 140, the control of the vehicle 100 for autonomous driving may be performed.

Figure 8:
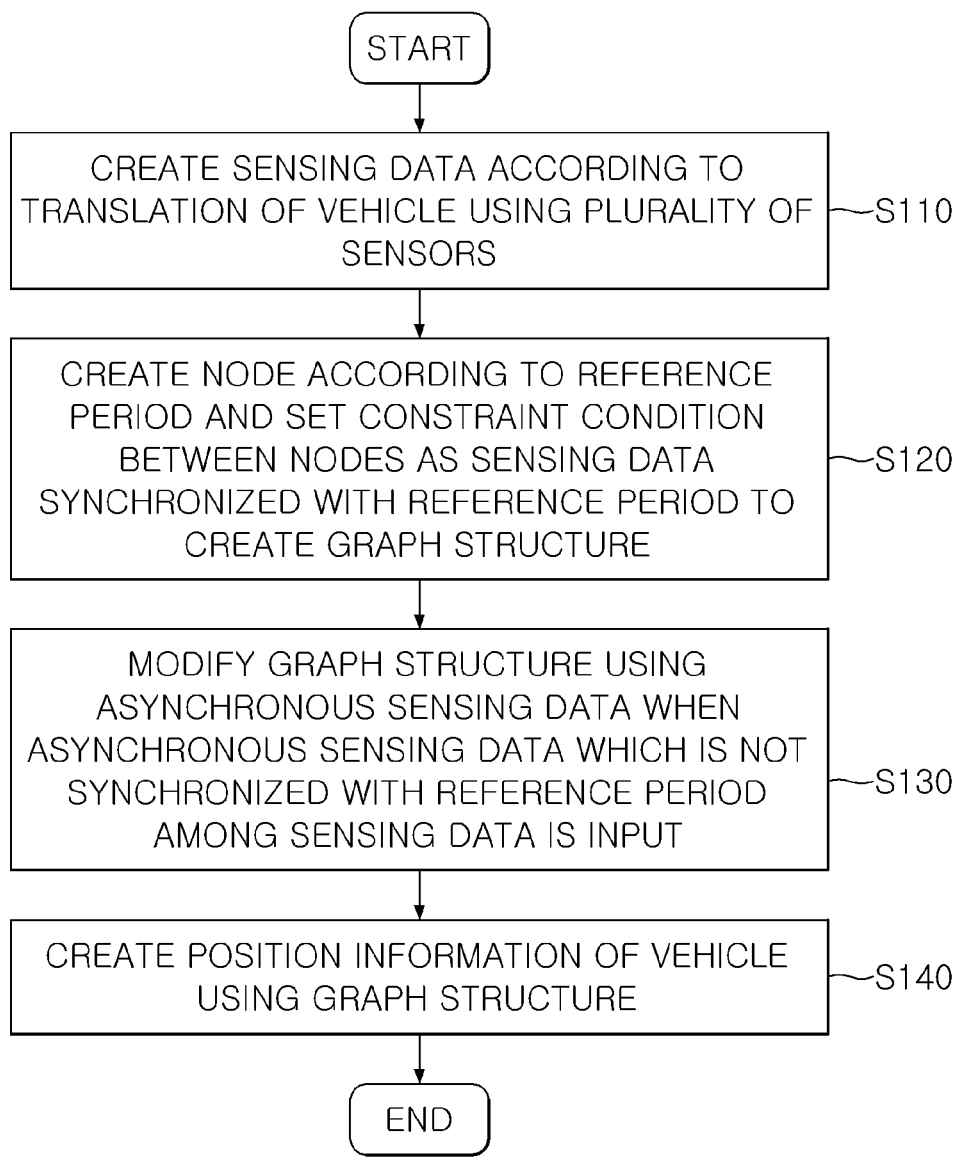
FIG. 8 is a flowchart illustrating a method for position estimation of a vehicle based on a graph structure according to an exemplary embodiment of the present invention.

FIG. 8 is a flowchart illustrating a method for position estimation of a vehicle based on a graph structure according to an exemplary embodiment of the present invention.

Referring to FIG. 8, the method for position estimation of a vehicle based on a graph structure according to an exemplary embodiment of the present invention may include a sensing step (S110), a graph structure creating step (S120), a graph structure modifying step (S130), and a position estimating step (S140). Here, respective steps may be performed by the vehicle.

Hereinafter, the method for position estimation of a vehicle based on a graph structure according to an exemplary embodiment of the present invention will be described with reference to FIG. 8.

In the sensing step (S110), sensing data according to translation of the vehicle may be created using a plurality of sensors. Specifically, the sensing data according to the translation of the vehicle 100 may be created using the inertial measurement unit (IMU) sensor 111, the global positioning system (GPS) sensor 112, the wheel encoder sensor 113, the LiDAR sensor 114, etc., mounted on the vehicle 100. However, the sensors included in the vehicle are not limited thereto, and in addition, the sensing data may be created using various types of sensors.

The sensing data created by the sensors may be divided into unary data and binary data. That is, the sensing data may be divided into the unary data indicating a measuring result at a creation time of the sensing data and the binary data indicating relationship information between a measurement start time and a measurement end time of the sensing data as the measuring result.

In the graph structure creating step (S120) performed by the graph structure construction unit 120, a node may be created according to a reference period and a constraint condition may be set between nodes to the sensing data synchronized with the reference period to create a graph structure. Here, any one of the sensing data may be set as reference data and a creation period of the reference data may be set as a reference period. That is, according to the creation period of the reference data, the nodes may be created to create the graph structure. At this time, other sensing data synchronized with the reference period may be input together and the input sensing data may be set as a constraint condition of the corresponding node. According to an exemplary embodiment, an IMU odometry of the IMU sensor may be set as the reference data.

In the graph structure modifying step (S130) performed by the graph structure modification unit 130, the graph structure may be modified by using the asynchronous sensing data when the asynchronous sensing data which is not synchronized with the reference period among the sensing data is input.

The sensing data created by the respective sensors may be sequentially input by a queue. At this time, the respective sensing data may be sequentially input according to a created order, but according to the exemplary embodiment, periods for creating the sensing data by the sensors may not coincide with each other. Further, a time required to create the sensing data varies for each sensor, and despite the sensing data at the same time, a case where the sensing data may be relatively late input to the queue may also occur.

That is, the sensing data may have different creation periods, and the asynchronous sensing data which is not synchronized with the creation period of the node may be input. At this time, in the case of simply excluding the asynchronous sensing data, accuracy in position estimation may be a problem, and thus it is necessary to modify the graph structure to match the asynchronous sensing data to the graph structure. Accordingly, in the graph structure modifying step (S130), the graph structure may be modified to match the asynchronous sensing data in the graph structure.

In this case, first, the creation time of the received asynchronous sensing data may be verified. That is, the creation time of the asynchronous sensing data and a creation time of the first node created recently in the graph structure may be compared with each other.

Here, when the asynchronous sensing data is created after the creation time of the first node, the second node corresponding to the creation time of the asynchronous sensing data may be newly created to be added to the graph structure. That is, since this corresponds to a case where the asynchronous sensing data is first input before the reference period arrives, a node corresponding to the creation time of the corresponding asynchronous sensing data is added to reflect the asynchronous sensing data onto the graph structure. In this case, a first constraint condition corresponding to the asynchronous sensing data may be set to the second node and a second constraint condition between the first node and the second node may be set using the reference data. That is, based on the graph structure, in the case where future data that has not yet been created is input, it is possible to modify the graph structure to add nodes corresponding to the corresponding asynchronous sensing data.

On the other hand, based on the creation time of the first node created most recently in the graph structure, when the asynchronous sensing data is created before the creation time of the first node, the graph structure may be modified using graph node interpolation or sensor data interpolation.

Specifically, when the asynchronous sensing data is unary data and the creation time of the asynchronous sensing data is different from the creation time of any of the nodes included in the graph structure by a predetermined interval or more, the graph node interpolation may be used.

In the case of using the graph node interpolation, a second node may be newly created at the creation time of the asynchronous sensing data and a first constraint condition corresponding to the asynchronous sensing data may be set to the second node. Further, a second constraint condition may be set using a between factor between the second node and the existing node.

When the asynchronous sensing data is unary data and a target node which has a difference by less than a predetermined interval (e.g., t=1) from the creation time of the asynchronous sensing data is present among any of the nodes included in the graph structure, the sensor data interpolation may be used. That is, the graph structure may be modified to add the constraint condition corresponding to the asynchronous sensing data to the target node included in the existing graph structure without separately creating the node corresponding to the asynchronous sensing data.

Even when the input asynchronous sensing data is the binary data, the graph structure may be modified and then reflected. Specifically, when the asynchronous sensing data is the binary data, the graph node interpolation may be used.

That is, when the measurement start time and the measurement end time of the asynchronous sensing data are before the creation time of the first node, a second node and a third node may be created at the measurement start time and the measurement end time of the asynchronous sensing data, respectively, and a first constraint condition between the second node and the third node may be set using the asynchronous sensing data. Further, a second constraint condition and a third constraint condition may be set using each between factor between target nodes closest to the second node and the third node.

According to the exemplary embodiment, there may also be a case where the measurement start time of the asynchronous sensing data is before the creation time of the first node and the measurement end time of the asynchronous sensing data is after the creation time of the first node. At this time, the second node and the third node may be created at the measurement start time and the measurement end time of the asynchronous sensing data and the first constraint condition between the second node and the third node may be set using the asynchronous sensing data. Here, the first constraint condition between the second node and the first node may be set by using the between element, and the second constraint condition between the third node and the first node may be set by using the reference data.

There may also be a case where the measurement start time and the measurement end time of the asynchronous sensing data are after the creation time of the first node. At this time, the second node and the third node may be created at the measurement start time and the measurement end time of the asynchronous sensing data and the constraint condition between the second node and the third node may be set using the asynchronous sensing data. Thereafter, the constraint condition between the second node and the first node and the constraint condition between the second node and the third node may be set using the reference data, respectively.

In the position estimating step (S140) performed by the position estimation unit 140, position information of the vehicle may be created using the graph structure. Specifically, graph optimization may be applied based on the constructed graph structure and a translation route of the vehicle and a final position over time may be estimated by using the optimized graph structure. That is, the position information including rotation information, translation information, and velocity information of the vehicle may be finally extracted from the modified graph structure. Thereafter, based on the extracted position information, the control of the vehicle for autonomous driving may be performed.

The present invention described above can be embodied as computer readable codes on computer readable media on which a program is recorded. The computer readable media may continuously store computer executable programs or temporarily store the computer executable programs for execution or download. Further, the media may be various recording means or storage means in which single hardware or several hardware is coupled, and is not limited to media directly connected to any computer system and may also be distributed on a network. Examples of the computer readable media may include magnetic media such as hard disks, floppy disks, and magnetic tape, optical media such as CD-ROM disks and DVD, magneto-optical media such as floptical disks, ROM, RAM, and flash memories and may be configured to store program commands. Further, examples of other media may also include recording media or storage media managed in app stores for distributing applications, or sites and servers for supplying and distributing other various software. Accordingly, the aforementioned detailed description should not be construed as restrictive in all terms and should be considered to be exemplary. The scope of the present invention should be determined by rational construing of the appended claims and all modifications within an equivalent scope of the present invention are included in the scope of the present invention.

The present invention is not limited by the aforementioned embodiments and the accompanying drawings. It will be apparent to those skilled in the art that components according to the present invention may be substituted, modified, and changed within the scope without departing from the technical scope of the present invention.

What is claimed is:

1. A method for position estimation of a vehicle based on a graph structure comprising:
    a sensing step of creating sensing data according to translation of the vehicle using a plurality of sensors;
    a graph structure creating step of creating, by a processor, a plurality of nodes according to a reference period and setting a constraint condition between the nodes to the sensing data synchronized with the reference period to create a graph structure;
    a graph structure modifying step of modifying, by the processor, the graph structure using asynchronous sensing data when the asynchronous sensing data which is not synchronized with the reference period among the sensing data is input; and
    a position estimating step of creating, by the processor, position information of the vehicle using the graph structure.

2. The method of claim 1, wherein in the sensing step, the sensing data according to the translation of the vehicle is created using at least one of an inertial measurement unit (IMU) sensor, a global positioning system (GPS) sensor, a wheel encoder sensor, and a LiDAR sensor mounted on the vehicle.

3. The method of claim 1, wherein the sensing data is unary data indicating a measuring result at a creation time of the sensing data and binary data indicating relationship information between a measurement start time and a measurement end time of the sensing data as the measuring result.

4. The method of claim 1, wherein in the graph structure creating step, any one of the sensing data is set as reference data and a creation period of the reference data is set as the reference period.

5. The method of claim 4, wherein in the graph structure creating step, an IMU odometry measured by the an inertial measurement unit (IMU) sensor mounted on the vehicle is set as the reference data.

6. The method of claim 1, wherein in the graph structure modifying step, based on a creation time of a first node created recently in the graph structure, if the asynchronous sensing data is created after the creation time of the first node, a second node corresponding to the creation time of the asynchronous sensing data is newly created to be added to the graph structure.

7. The method of claim 6, wherein in the graph structure modifying step, a first constraint condition corresponding to the asynchronous sensing data is set to the second node and a second constraint condition between the first node and the second node is set using reference data.

8. The method of claim 1, wherein in the graph structure modifying step, based on a creation time of a first node created recently in the graph structure, when the asynchronous sensing data is created before the creation time of the first node, the graph structure is modified using graph node interpolation or sensor data interpolation.

9. The method of claim 8, wherein in the graph structure modifying step, when the asynchronous sensing data is unary data and a creation time of the asynchronous sensing data is different from the creation time of any of the nodes included in the graph structure by a predetermined interval or more, the graph structure is modified using the graph node interpolation.

10. The method of claim 9, wherein in the graph structure modifying step, a second node is newly created at the creation time of the asynchronous sensing data by using the graph node interpolation, a first constraint condition corresponding to the asynchronous sensing data is set to the second node, and a second constraint condition is set using a between factor between the second node and the existing node.

11. The method of claim 8, wherein in the graph structure modifying step, when the asynchronous sensing data is unary data and a target node which has a difference by less than a predetermined interval from a creation time of the asynchronous sensing data is present among any of the nodes included in the graph structure, the graph structure is modified using the sensor data interpolation.

12. The method of claim 11, wherein in the graph structure modifying step, a constraint condition corresponding to the asynchronous sensing data is additionally set to the target node.

13. The method of claim 1, wherein in the graph structure modifying step, when the asynchronous sensing data is binary data, the graph structure is modified using graph node interpolation.

14. The method of claim 13, wherein in the graph structure modifying step, when a measurement start time and a measurement end time of the asynchronous sensing data are before a creation time of a first node, a second node and a third node are created at the measurement start time and the measurement end time of the asynchronous sensing data, respectively, a first constraint condition between the second node and the third node is set using the asynchronous sensing data, and a second constraint condition and a third constraint condition are set using each between factor between target nodes closest to the second node and the third node.

15. The method of claim 13, wherein in the graph structure modifying step, when a measurement start time of the asynchronous sensing data is before a creation time of a first node and a measurement end time of the asynchronous sensing data is after the creation time of the first node, a second node and a third node are created at the measurement start time and the measurement end time of the asynchronous sensing data, a first constraint condition between the second node and the third node is set using the asynchronous sensing data, a first constraint condition between the second node and the first node is set by using the between element, and a second constraint condition between the third node and the first node is set by using the reference data.

16. The method of claim 1, wherein in the position estimating step, the position of the vehicle is estimated using graph optimization based on the constructed graph structure.

17. A computer readable recording medium storing a computer program which, when executed by a processor, enables the processor to perform the method for position estimation of the vehicle based on the graph structure as recited in claim 1.

18. A vehicle comprising:
a sensor unit configured to create sensing data according to translation of the vehicle using a plurality of sensors;
a graph structure construction unit configured to create a plurality of nodes according to a reference period and set a constraint condition between the nodes to the sensing data synchronized with the reference period to create a graph structure;
a graph structure modification unit configured to modify the graph structure using asynchronous sensing data when the asynchronous sensing data which is not synchronized with the reference period among the sensing data is input; and
a position estimation unit configured to create position information of the vehicle using the graph structure.

* * * * *